Figure 1:
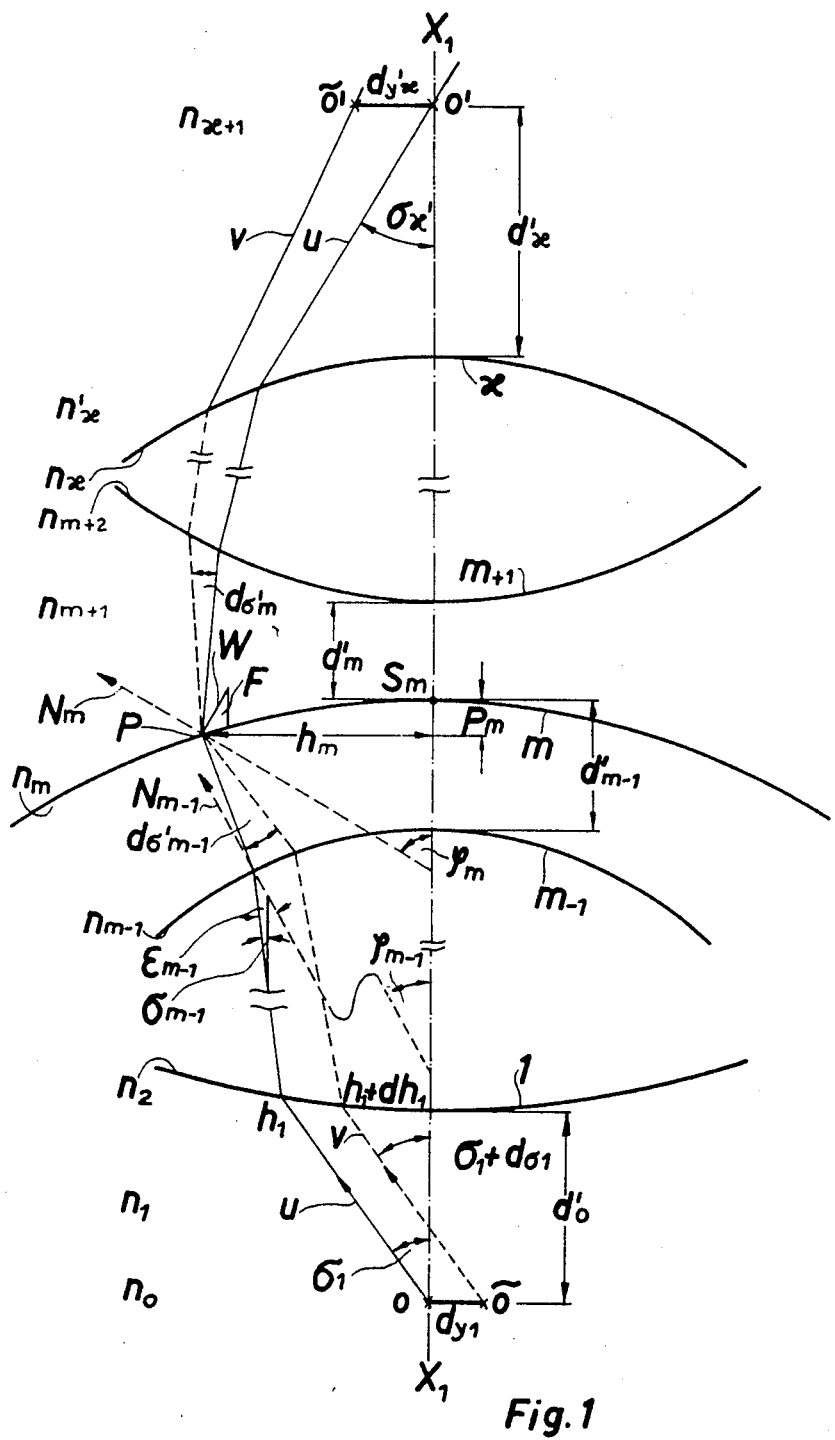

United States Patent
Hofmann et al.

[15] 3,653,751
[45] Apr. 4, 1972

[54] OPTICAL SYSTEM HAVING FRESNEL SURFACES FOR IMAGING NEAR-AXIS POINTS WITHOUT MERIDIONAL COMA

[72] Inventors: Christian Hofmann; Jorg Neumann, both of Jena, Germany

[73] Assignee: Jenoptik Jena G.m.b.H., Jena, Germany

[22] Filed: Sept. 5, 1969

[21] Appl. No.: 869,987

[52] U.S. Cl. ........................................................350/211
[51] Int. Cl. ..................................................G02b 3/08
[58] Field of Search..................................350/211

[56] References Cited

FOREIGN PATENTS OR APPLICATIONS 1,115,934   6/1968   Great Britain..........................350/211

OTHER PUBLICATIONS

Miyamoto; " The Phase Fresnel Lens," Journal of The Optical Society of America, Vol. 51, No. 1, Jan. 1961, pp. 17– 20

Primary Examiner—John K. Corbin

[57] ABSTRACT

An imaging optical system comprises at least one Fresnel face, which is such that the entire system images aplanatically.

11 Claims, 5 Drawing Figures

OPTICAL SYSTEM HAVING FRESNEL SURFACES FOR IMAGING NEAR-AXIS POINTS WITHOUT MERIDIONAL COMA

This invention relates to optical systems which image near-axis points without meridional coma and comprise at least one Fresnel face at any desired place. The Fresnel echelons may be located on an exterior bounding surface of the system or an an air face or a cemented face within the system.

For the purpose of miniaturizing optical systems, use has been made of Fresnel lenses in which, barring unavoidable residual errors inherent in the echelon breadths, spherical aberration is obviated in much the same manner as in aspherical lenses. Aplanatic correction, however, is generally as impossible as with aspherical faces, because an aplanatic face will satisfy the law of refraction only in exceptional cases.

It has accordingly been proposed to compass aplanatic correction by employing spherically corrected Fresnel faces that are curved to comply with Abbe's sine law. Attempts in that direction must necessarily fail, since imaging by Fresnel faces is incompatible with the principle of constancy in optical path lengths, so that Abbe's sine law cannot serve as a criterion in aplanatic imaging. As imaging without constancy in the optical path length cannot operate with the same sagittal and meridional imaging scales for the several aperture rays, an exact aplanatic image — in the sense of an image, aberrationless for all rays, of the near-axis surroundings of an axial object point — cannot in principle be obtained by means of known Fresnel optics. As Fresnel optics admit constancy only with respect to the meridional or sagittal image scale — a constant meridional image scale being of the greater importance in practice —, the meridional aplanatism of such optics is considered only as the correction of the meridional coma of near-axis points. Regarding spherically corrected Fresnel faces, it is feasible to differentiate a condition of that kind which holds good independently of the constancy of the optical path length and the fulfillment of which warrants constancy in the meridional image scale for all aperture rays and accordingly warrants correction of the meridional coma for near-axis points. This imaging condition is satisfied if the Fresnel faces are curved appropriately. The aplanatic Fresnel lenses are in this case a combination of two aplanatic faces the one of which is generally an aplanatic Fresnel face and the other of which is generally a spherical face, the object points and the image points of these faces being aplanatic pairs of points. Such aplanatic Fresnel lenses made up of two aplanatic faces have the disadvantage that, so far as it is not preferred to make use of the even more unfavorable case of lenses with two aplanatic Fresnel faces, the aplanatic Fresnel face will have to do all the refraction alone. Aplanatic Fresnel lenses of the foregoing kind do not accordingly render possible every image scale with high aperture.

A further considerable disadvantage of aplanatic Fresnel lenses comprising two aplanatic faces consists in their refusal of achromatization.

In highly refractive aplanatic systems comprising a plurality of Fresnel lenses it is disadvantageous for each lens to have its aplanatism corrected individually.

The present invention aims at providing an optical system in which at least one Fresnel face serves for correcting the system aplanatically and which is at the same time formed to fulfill the condition of achromatism.

To this end the present invention consists in an optical system which images near-axis points without meridional coma and has at least one Fresnel face at any desired place, wherein the meridional curve of the base of the Fresnel optics satisfies the condition $$\beta'_{1x} \cdot \Pi_{12}^{(o,m-1)} - \Sigma_{12}^{(m,x)} = 0$$

and wherein the normal of the active flanks of the Fresnel optics on the one hand and the optical axis of the system on the other hand enclose an angle $\varphi$, which results from $$\tan \varphi_m = \frac{n'_m \sin \sigma'_m - n'_{m-1} \sin \sigma'_{m-1}}{n'_m \cos \sigma'_m - n'_{m-1} \cos \sigma'_{m-1}}$$

wherein $\beta'_{1x}$ is the paraxial image scale of the system, $a(0,m-1)$ and $b(m,x)$ are matrices, $n_m'$ is the refractive index on the image side of the face $m$ carrying the Fresnel optics, $n_{m-1}'$ is the refractive index on the object side of the Fresnel face, $\sigma_m'$ is the angle enclosed by the optical axis and an aperture ray on the image side of the Fresnel face, and $\sigma_{m-1}'$ is the angle enclosed by the optical axis and an aperture ray on the object side of the Fresnel face. This optical system, which has a constant meridional image scale for all aperture rays, images the immediate orthogonal surroundings of the selected axial object point without meridional coma. A Fresnel face which complies with the foregoing condition renders feasible the correction of any prescribed system for aplanatically imaging the near-axis surroundings of an axial object point, so that there is no meridional coma and no spherical aberration. In some cases where a maximum of imaging accuracy is not necessarily required and Fresnel faces with relatively broad active flanks are used, exact aplanatic correction can be dispensed with. In these cases it is sufficient according to the invention so to distribute the refractive powers of the parts of the system which are on the object side and/or on the image side of the Fresnel face that departures from the aforementioned condition with respect to the meridional curve of the base carrying the Fresnel optics amount to a minimum. The degree of correction thus obtained for the base carrying the Fresnel optics may be termed meridional quasi-aplanatism.

As a border case, the optical system may be one single lens. Such a lens may have Fresnel optics on one face or on both faces. If a Fresnel optics is on only one face, which may be plane, the other face will have to be spherical. If Fresnel optics are on both faces, it is advantageous that both be plane. In general, the faces carrying Fresnel optics may be any one in the optical system. However, if the optical system comprises two lenses (and is for example a condenser), the Fresnel optics are advantageously located on two plane lens surfaces that face one another. For correcting the optical system of the invention it is advantageous for the refractive powers of the faces to be distributed according to the condition of achromatism. This condition which is known to concern either the locus of the image and the distance between image and the distance between image and lens vertex or the image size and the focal length, is described for example in "Grundlagen der praktischen Optik", by M. Berek, published by Walter de Gruyter & Co., Berlin - Leipzig, 1930, pages 93 and 94.

Figure 2:
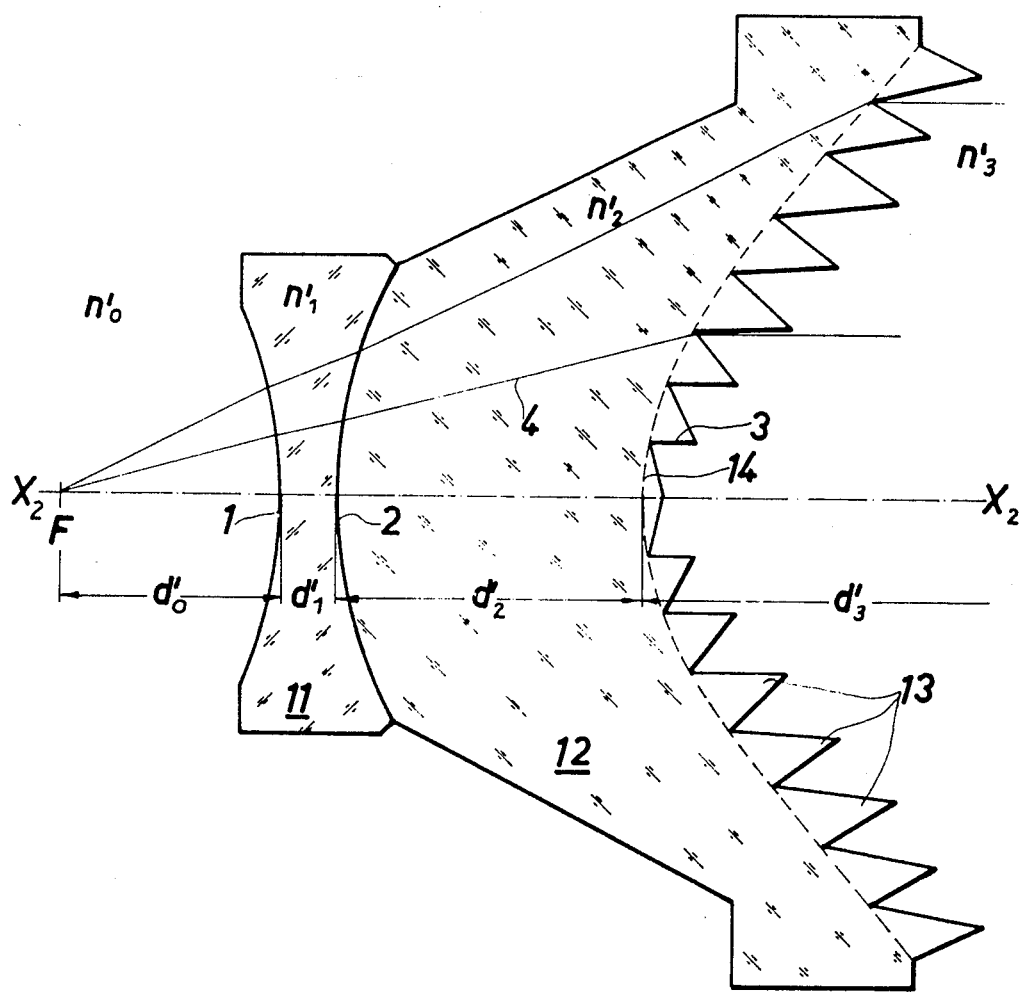
Figure 3:
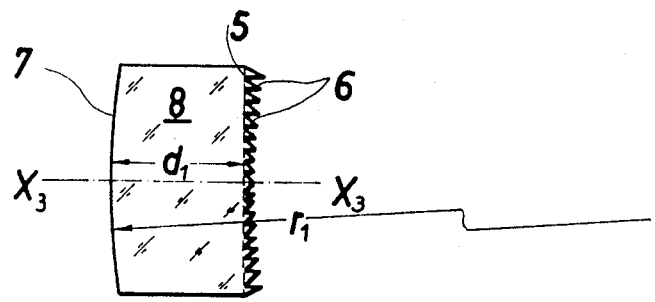
Figure 4:
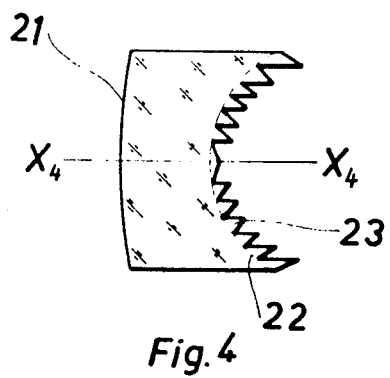
Figure 5:
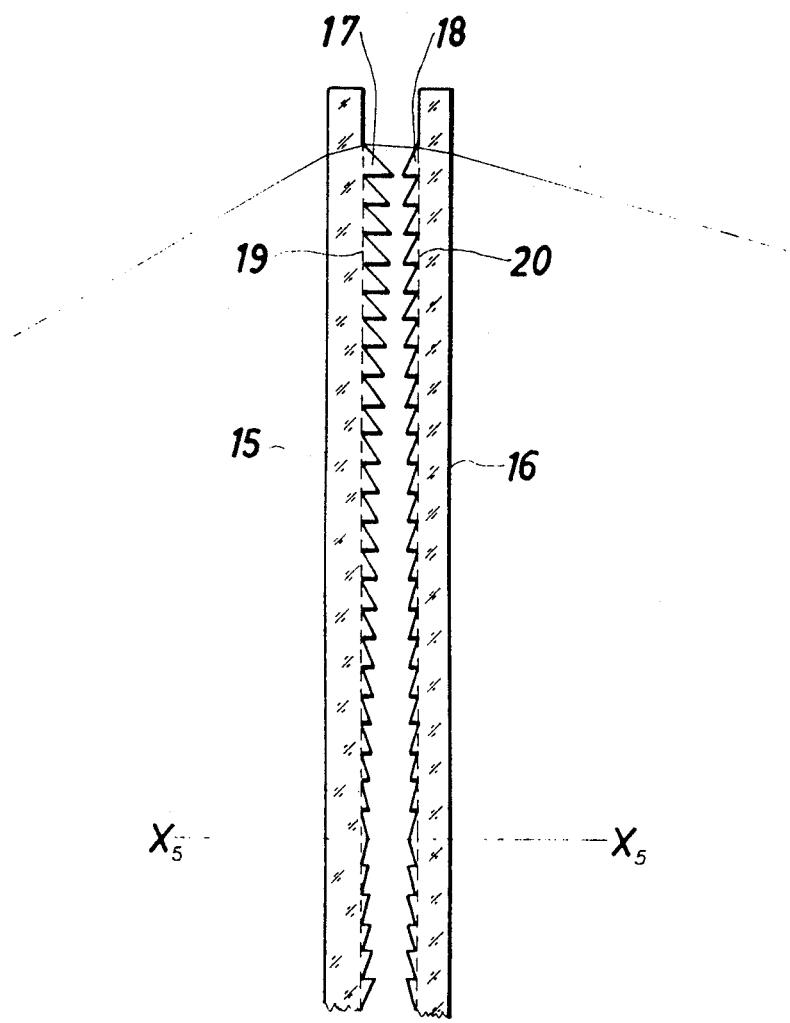

In order that the invention may be more readily understood, reference is made to the accompanying drawings which illustrate diagrammatically and by way of example four embodiments thereof and in which FIG. 1 is a diagrammatical representation for explaining the mathematical relations in a multifaced optical system, FIG. 2 is a first embodiment, a two-lens achromat for the immediate surroundings of an axial image point, without meridional coma, having a Fresnel face, FIG. 3 is a second embodiment, a quasi-aplanatic Fresnel lens, FIG. 4 is a third embodiment, a Fresnel lens aplanatically corrected in its meridian, and FIG. 5 is a fourth embodiment, a two-lens condenser.

In FIG. 1 of the drawings, the expressions 1, $m-1$, $m$, $m+1$, and $x$ denote faces of an optical system having an optical axis $X_1-X_1$, wherein between further faces (not shown) are located. The face $m$ carries a Fresnel optics, of which for the sake of clarity only one echelon F is shown. W in the sense of the invention is an active flank of the echelon F. $0-\bar{0}$ are two points of an object which have from one another a small distance $dy_1$ at right angles to the optical axis $X_1-X_1$. Two imaging rays $u$ and $v$ emanate respectively from the object points 0 and $\bar{0}$. On the object side of the first face 1 of the system, the rays $u$ and $v$ respectively enclose with the optical axis $X_1-X_1$ an angle $\sigma_1$ and an angle $\sigma_1 + d\sigma_1$. The rays $u$ and $v$ strike the surface 1 respectively at distances $h_1$ and $h_1 + dh_1$ from the optical axis $X_1-X_1$ when entering the optical system. Accordingly, the distances of the rays $u$ and $v$ from the optical axis $X_1-X_1$ and their angles of incidence at the surface $m-1$ are $h_{m-1}$, $h_{m-1}+dh_{m-1}$ and $\sigma_{m-1}$, $\sigma_{m-1}+d\sigma_{m-1}$. The axis of incidence of the ray $u$ on the face $m-1$ is $N_{m-1}$ and together with the optical axis $X_1-X_1$ encloses an angle $\phi_{m-1}$. The imaging ray $u$ and its axis of incidence $N_{m-1}$ enclose an angle $\epsilon_{m-1}$.

The two rays $u$ and $v$ converge at an angle $d\sigma_{m-1}'$ at a point P on the active flank W. The point P, which is the foot of a perpendicular $N_m$, is from the optical axis $X_1-X_1$ at a straight distance $h_m$, and its vertical projection on the optical axis $X_1-X_1$ is at a distance (height of arc) $p_m$ from the vertex $S_m$ of the plane $m$. The perpendicular $N_m$ and the optical axis enclose an angle $\phi_m$. On the image side of point P, the imaging rays $u$ and $v$ diverge at an angle $d\sigma_m'$, traverse the faces $m+1$ to $x$ of the system, and image the object points 0 and $\bar{0}$ respectively as image points $0'$ and $\bar{0}'$. The image points $0'$ and $\bar{0}'$ are from one another at a distance $dy_x'$ which is at right angles to the optical axis $X_1-X_1$, and the point $0'$ lies on the optical axis. On the image side of the system, the imaging ray $u$ and the optical axis $X_1-X_1$ enclose an angle $\sigma_x'$. The indices of refraction of the spaces bounded at least on one side by the faces 1 to $x$ of the system are designated $n_1, n_2, \ldots, n_{m-1}, n_m, n_{m+1}, \ldots, n_x, n_{x+1}$. The index of refraction in front of the object (point 0) is $n_0$ and the index of refraction in the rear of the image (point $0'$) is $n_{x+1}$. Accordingly, the face containing the object is 0 (zero) and the face containing the image $x+1$. The vertices of the faces are from each other at distances $d_i$.

The aforementioned index $m$ denotes the face carrying echelons, which may be any face of the optical system. The indices $i$ and $k$ are hereinafter used for deriving the general equation of condition, and they also denote any face of the optical system, but regardless of the echelons. These indices may not of course designate one and the same surface.

The following is a description of how to derive from any number of uncorrected faces of an optical system the general condition of aplanatism that spherically corrected Fresnel optics must fulfill for aplanatic imaging. In this description, the index $i$ denotes any of the faces 1 to $x$, and it is assumed for the sake of simplicity that $i$ and $m$ are identical with each other.

As $\phi_i - \sigma_i = \epsilon_i$ and $\epsilon_i' = \phi_i - \sigma_i'$, the law of refraction may be expressed as $$n_i \sin(\phi_i - \sigma_i) = n_i \sin \epsilon_i = n_i' \sin \epsilon_i' = n_i' \sin(\phi_i - \sigma_i') \quad (1)$$

Considering that $\sigma_i = \sigma_{i-1}'$ and $n_i = n_{i-1}'$, the inclination of the perpendicular on the active blank at a definite point of incidence of any optically effective face (i) is $$\tan \varphi_i = \frac{n_i' \sin \sigma_i' - n_{i-1}' \sin \sigma_{i-1}'}{n_i' \cos \sigma_i' - n_{i-1}' \cos \sigma_{i-1}'} \quad (2)$$

The variation of the inclinations of the perpendiculars of neighbouring rays can be represented as a total differential of Equation (2):

$$d\tan\varphi_i = \left[\frac{n_i'\{n_i' - n_{i-1}'\cos(\sigma_i' - \sigma_{i-1}')\}\frac{d\sigma_i'}{dh_i}}{\{n_i'\cos\sigma_i' - n_{i-1}'\cos\sigma_{i-1}'\}^2}\right.$$

$$\left.+\frac{n_{i-1}'\{n_{i-1}' - n_i'\cos(\sigma_i' - \sigma_{i-1}')\}\frac{d\sigma_{i-1}'}{dh_i}}{\{n_i'\cos\sigma_i' - n_{i-1}'\cos\sigma_{i-1}'\}^2}\right]dh_i \quad (3)$$

From the Equation (3) and the transitional formula
$$_{i+1} = h_i - (d_i' + p_{i+1} - p_i)\tan\sigma_i' \quad (4)$$
concerning the ray path between the faces $i$ and $i+1$, there result the connections between the change $d\sigma_i$ in the ray inclination $\sigma_i$ and the change $dh_i$ in the height of incidence $h_i$, whereby $\sigma_i' = \sigma_{i-1}$.

$$dh_i = A_i \, dh_{i+1} + B_i \, d\sigma_{i+1} \quad (5a)$$
$$dh_{i+1} = A_i^- \, dh_i + B_i^- \, d\sigma_{i+1} \quad (5b)$$
$$d\sigma_i = C_i \, dh_i + D_i \, d\sigma_{i+1} \quad (6a)$$
$$d\sigma_{i+1} = C_i^- \, dh_i + D_i^- \, d\sigma_i \quad (6b)$$

The coefficients of these equations are defined as follows:

$$A_i = \frac{1 + \frac{dp_{i+1}}{dh_{i+1}}\tan\sigma_i'}{1 + \frac{dp_i}{dh_i}\tan\sigma_i'} = \frac{1}{A_i^*} \quad (7)$$

$$B_i = \frac{d_i' + p_{i+1} - p_i}{\left(1 + \frac{dp_i}{dh_i}\tan\sigma_i'\right)\cos^2\sigma_i'} \quad (8a)$$

$$B_i^* = -\frac{d_i' + p_{i+1} - p_i}{\left(1 + \frac{dp_{i+1}}{dh_{i+1}}\tan\sigma_i'\right)\cos^2\sigma_i'} \quad (8b)$$

$$C_i = \frac{(n_i'\cos\sigma_i' - n_{i-1}\cos\sigma_{i-1}')^2}{n_{i-1}'[n_{i-1}' - n_i'\cos(\sigma_i' - \sigma_{i-1}')]} \cdot \frac{d\tan\varphi_i}{dh_i} \quad (9a)$$

$$C_i^* = \frac{(n_i'\cos\sigma_i' - n_{i-1}'\cos\sigma_{i-1}')^2}{n_i'[n_i' - n_{i-1}'\cos(\sigma_i' - \sigma_{i-1}')]} \cdot \frac{d\tan\varphi_i}{dh_i} \quad (9b)$$

$$D_i = -\frac{n_i'[n_i' - n_{i-1}'\cos(\sigma_i' - \sigma_{i-1}')]}{n_{i-1}'[n_{i-1}' - n_i'\cos(\sigma_i' - \sigma_{i-1}')]} = \frac{1}{D_i^*} \quad (10)$$

From the equations (5a) and (6a) on the one hand and the equations (5b) and (6b) on the other hand, there result the combination $$d\sigma_i = C_i A_i \, dh_{i+1} + (C_i B_i + D_i) \, d\sigma_{i+1} \quad (11)$$

and, respectively, the combination $$dh_{i+1} = (A_i^- + B_i^- C_i^-) \, dh_i + B_i^- D_i^- \, d\sigma_i \quad (12)$$

Considering the abbreviations $$\left.\begin{array}{l}\Pi_{11}^{(i)} = A_i; \quad \Pi_{12}^{(i)} = B_i; \\ \Pi_{21}^{(i)} = C_i A_i; \quad \Pi_{22}^{(i)} = C_i B_i + D_i;\end{array}\right\} \quad (13a)$$

$$\left.\begin{array}{l}\Sigma_{11}^{(i)} = A_i^* + B_i^* C_i^*; \quad \Sigma_{12}^{(i)} = B_i^* D_i^*; \\ \Sigma_{21}^{(i)} = C_i^*; \quad \Sigma_{22}^{(i)} = D_i^*;\end{array}\right\} \quad (13b)$$

there follows from equations (5b) and (11) on the one hand and (6b) and (12) on the other hand the matrix equation $$\begin{pmatrix}dh_i\\d\sigma_i\end{pmatrix} = \underline{\Pi}^{(i)}\begin{pmatrix}dh_{i+1}\\d\sigma_{i+1}\end{pmatrix} \quad (14a)$$

and, respectively, the matrix equation $$\begin{pmatrix}dh_{i+1}\\d\sigma_{i+1}\end{pmatrix} = \underline{\Sigma}^{(i)}\begin{pmatrix}dh_i\\d\sigma_i\end{pmatrix} \quad (14b)$$

The magnitude $a^{(i)}$ in equation (14a) is the matrix from the elements (13a), and the magnitude $b^{(i)}$ in equation (14b) is the matrix from the elements (13b).

There follows from equation (14a) that a change in any face $(i)$ can be calculated from a change in a second face $(k)$ anywhere on the image side of $(i)$ by a simple matrix multiplication $$\begin{pmatrix}dh_i\\d\sigma_i\end{pmatrix} = \Pi^{(i)}\Pi^{(i+1)}\cdots\Pi^{(k-2)}\Pi^{(k-1)}\begin{pmatrix}dh_k\\d\sigma_k\end{pmatrix}$$

$$= \Pi^{(i,k-1)}\begin{pmatrix}dh_k\\d\sigma_k\end{pmatrix} \quad (15a)$$

and from equation (14b) that a change in any face $(k)$ can be calculated from a change in a second face $(i)$ anywhere on the object side of $(k)$ by a simple matrix multiplication $$\begin{pmatrix}dh_k\\d\sigma_k\end{pmatrix} = \Sigma^{(k-1)}\Sigma^{(k-2)}\cdots\Sigma^{(i+1)}\Sigma^{(i)}\begin{pmatrix}dh_i\\d\sigma_i\end{pmatrix}$$

$$= \Sigma^{(i,k-1)}\begin{pmatrix}dh_i\\d\sigma_i\end{pmatrix} \quad (15b)$$

Considering that $$\left.\begin{array}{l}dh_0 = dy_1; \quad dh_{x+1} = d\tilde{y}_x'; \quad n_0' = n_1; \quad n_{x+1} = n_x'; \\ \sigma_0' = \sigma_1; \quad \sigma_{x+1} = \sigma_x'; \quad d_0' = -s_1; \quad d_x' = s_x' \\ p_0 = p_{x+1} = \frac{dp_0}{dh_0} = \frac{dp_{x+1}}{dh_{x+1}} = \frac{d\tan\varphi_{x+1}}{dh_{x+1}} = 0\end{array}\right\} \quad (16)$$

there follows from the equations (15) for a system of $x$ faces a combination of the object-space magnitudes $d\sigma_1$ and $dy_1$ $$\begin{pmatrix} dy_1 \\ d\sigma_1 \end{pmatrix} = \Pi^{(o,x)} \begin{pmatrix} dy'_x \\ d\sigma'_x \end{pmatrix} \quad (17a)$$

and a combination of the image-space magnitudes $d\sigma'$ and $dy'$ $$\begin{pmatrix} d\tilde{y}'_x \\ d\sigma'_x \end{pmatrix} = \Sigma^{(o,x)} \begin{pmatrix} dy_1 \\ d\sigma_1 \end{pmatrix} \quad (17b)$$

It is possible without restricting the general validity of the derived mathematical equations to insert $dh_i$ arbitrarily for one of the $x$ faces. According to FIG. 1, the Fresnel face $m$ is equalled to $dh_m = 0$, so that there holds good the matrix equations $$\begin{pmatrix} dy_1 \\ d\sigma_1 \end{pmatrix} = \Pi^{(o,m-1)} \begin{pmatrix} 0 \\ d\sigma_m \end{pmatrix} \quad (18a)$$

$$\begin{pmatrix} d\tilde{y}'_x \\ d\sigma'_x \end{pmatrix} = \Sigma^{(m,x)} \begin{pmatrix} 0 \\ d\sigma_m \end{pmatrix} \quad (18b)$$

and $$\begin{pmatrix} dy_1 \\ d\sigma_1 \end{pmatrix} = \begin{pmatrix} \Pi_{12}^{(0,m-1)} \\ \Pi_{22}^{(0,m-1)} \end{pmatrix} \cdot d\sigma_m \quad (18c)$$

$$\begin{pmatrix} d\tilde{y}'_x \\ d\sigma'_x \end{pmatrix} = \begin{pmatrix} \Sigma_{12}^{(m,x)} \\ \Sigma_{22}^{(m,x)} \end{pmatrix} \cdot d\sigma_m \quad (18d)$$

By means of the relations which respectively result from the equations (18c) and (18d) as $$d\tilde{y}'_x = \Sigma_{12}^{(m,x)} d\sigma_m \text{ and } dy_1 = \Pi_{12}^{(1,m-1)} d\sigma_m$$

and by considering the definition of the paraxial image scale $$\beta_{1n}' = (dy_n')/(dy_1) \quad (19)$$

an equation is obtained which defines the meridional transverse aberration $$\Delta dy_n' = dy_n' - d\tilde{y}_n' \quad (20)$$

at near-axis image points:

$$\Delta dy'_x = -\left\{ \beta'_{1x} - \frac{\Sigma_{12}^{(m,x)}}{\Pi_{12}^{(o,m-1)}} \right\} dy_1 \quad (21)$$

From equation (21) there follows as a criterion for the correction of the meridional coma near the axis of any $n$-faced system in which $\Delta dy_n' = 0$ $$\beta_{1n}' = (b_{12}^{m,n})/(a_{12}^{(o,m-1)}) \quad 22$$

as general aplanatism condition of spherically corrected Fresnel optics comprising $n$-faces.

For imaging from infinity, the equation (22) becomes the focal-length condition $$f_{1x}' = (n_{n'} b_{12}^{(m,n)})/(n_1 a_{12}^{(1,m-1)}) \quad 22a$$

wherein $f_{1n}'$ is the image-side focal length of the optical system. By considering the equations (13a/b), (7), (8a), (8b) and (10), the general aplanatism equation (22) can be demonstrated as $$\beta'_{1x} = \frac{n_1 \sin \sigma_1 \cos \sigma_1}{n'_x \sin \sigma'_x \cos \sigma'_x} \cdot Q^{(1,x)} \quad (22b)$$

by $$Q = \frac{\Sigma_{11}^{(m,x-1)} h_x - \Sigma_{12}^{(m,x-1)} n'_x \sin \sigma'_x \cos \sigma'_x}{\Pi_{12}^{(1,m-1)} \sin \sigma_1 \left(\cos \sigma_1 + \frac{dp_1}{dh_1} \sin \sigma_1\right) - \Pi_{22}^{(1,m-1)} \cdot h_1}$$

$$\frac{n_x \{n_x - n'_x \cos(\sigma'_x - \sigma_x)\}}{n_1 \{n'_x - n_x \cos(\sigma'_x - \sigma_x)\}} \quad (23)$$

This means that the general condition of aplanatism corresponds to Abbe's classical sine law with the exception of the factor $$(\cos \sigma_1)/(\cos \sigma_n') \cdot Q^{(1,n)}$$

From the general condition of aplanatism (22) a number of particular cases suiting particular conditions can be deduced. Some of these are referred to hereinafter.

If the correcting Fresnel face is a last surface $x$ of an $x$-faced optical system, the equation (22) changes to an equation defining the aperture-ray inclination $\sigma_x'$ on the image side:

$$\frac{\epsilon'_x - p_x}{\cos^2 \sigma_x} \cdot \frac{n'_{x-1}\{n'_{x-1} - n'_x \cos(\sigma'_x - \sigma'_{x-1})\}}{n'_x \{n'_x - n'_{x-1} \cos(\sigma'_x - \sigma'_{x-1})\}}$$

$$- \frac{(d'_{x-1} + p_x - p_{x-1})\beta'_{1x}}{\left(1 + \frac{dp_{x-1}}{dh_{x-1}} \tan \sigma_x\right) \cos \sigma_x} \{\Pi_{11}^{(0,x-2)} + \Pi_{12}^{(0,x-2)} \cdot C_{x-1}\}$$

$$= \beta'_{1x} \Pi_{12}^{(0,x-2)} D_{x-1} \quad (24)$$

In the particular case of a spherically corrected single face, because $$\Pi_{12}^{(0)} = B_o = -\frac{s_1 - p_1}{\cos^2 \sigma_1} \quad (13c)$$

$$_{12}^{(1)} = B_1^* D_1^* = \frac{s'_1 - p_1}{\cos^2 \sigma_1} \cdot \frac{n_1\{n_1 - n'_1 \cos(\sigma'_1 - \sigma_1)\}}{n'_1\{n'_1 - n_1 \cos(\sigma'_1 - \sigma_1)\}} \quad (13d)$$

$$\frac{\cos \epsilon_1}{\cos \epsilon'_1} \cdot \frac{n_1 - n'_1 \cos(\sigma'_1 - \sigma_1)}{n_1 \cos(\sigma'_1 - \sigma_1) - n'_1} \quad (25)$$

and $$h_1 = (\sigma_1' - p_1) \tan \sigma_1' = (s_1 - p_1) \tan \sigma_1 \quad 26$$

the general condition of aplanatism (22) changes to a particular case $$\beta' = \frac{n \cdot \sin \sigma}{n' \cdot \sin \sigma'} \cdot \frac{\cos \sigma \cos \epsilon}{\cos \sigma' \cos \epsilon'} \quad (27)$$

already known.

As the general condition of aplanatism (22) may also be considered an equation defining the ray inclination $\sigma_m'$ in the image space of the Fresnel face $m$ as a function $$\sigma_m' = \sigma_m'(\sigma_m) \quad 28$$

of the ray inclination $\sigma_m$ in the object space of this face, it is possible to define the base of the Fresnel face $m$. The active-flank function $\tan \phi_m(\sigma_m', \sigma_m)$ corresponding to this face can be obtained from equation (2).

By means of equation (22) it is thus feasible aplanatically to correct any desired optical systems by an appropriately located Fresnel face, the only thing to be done being a trigonometrical calculation of the partial systems 1 to $m-1$ in the object space and/or the partial systems $m+1$ to $n$ in the image space of the Fresnel face $m$, so as to find the product matrices $a^{(o,m-1)}$ and/or $b^{(m,n)}$. By variation of $\sigma_m'$, while retaining $\sigma_m$, that value of $\sigma_m'$ is determined which satisfies the general aplanatism condition of the prescribed magnitude $\sigma_m$. It is thus possible to calculate the meridional curve (28) of the base of the Fresnel face $m$ point by point.

As the distributions of the powers of refraction of the partial systems 1 to $m-1$ and $m+b$ to $n$ are arbitrary, the condition of achromatism can be satisfied for the entire system 1 to $x$, and it is thus possible to construct aplanatic achromats comprising a Fresnel face.

With an aplanatic single lens having any desired constant object-side face, the equation (22) becomes $$\frac{d' + p_2 - p_1}{\cos^2 \sigma_2} \cdot \frac{1 + \tan \varphi_1 \tan \sigma_1}{1 + \tan \varphi_1 \tan \sigma_2} - \frac{s_1 - p_1}{\cos^2 \sigma_1} \cdot \frac{n\{n - \cos(\sigma_1 - \sigma_2)\}}{n \cdot \cos(\sigma_1 - \sigma_2) - 1}$$

$$+ \frac{s_1 - p_1}{\cos^2 \sigma_1} \cdot \frac{d' + p_2 - p_1}{\cos^2 \sigma_2} \cdot \frac{d \tan \varphi_1}{1 + \tan \varphi_1 \tan \sigma_2}$$

$$\cdot \frac{(n \cdot \cos \sigma_2 - \cos \sigma_1)^2}{n \cdot \cos(\sigma_1 - \sigma_2) - 1} + \frac{s'_2 - p_2}{\beta'_{12} \cos^2 \sigma'_2}$$

$$\cdot \frac{n\{n - \cos(\sigma'_2 - \sigma_2)\}}{n \cdot \cos(\sigma'_2 - \sigma_2) - 1} = 0 \quad (29)$$

The aplanat shown in FIG. 2 comprises two lenses, namely a biconcave lens 11 and a convex-concave lens 12. The convex face of the lens 12 is cemented to the lens 11, and the concave face of the lens 12 carries Fresnel echelons 13 on a base 14. The numerals 1, 2 and 3 denote the faces of the lens system. There has to be considered that the efficacy of the face 3 depends on both the base 14 and the echelons 13. The object-side focus of the aplanat 11, 12 is F. An object at F is imaged at infinity. The thicknesses of the parts of the system are $d_0' = 0.4$ cm, $d_1' = 0.1$ cm
$d_2' = 0.5523$ cm, $d_3' = \infty$ The refractive indices are, accordingly, $n_0' = 1$ $n_1' = 1.6254$
$n_2' = 1.493, n_3' = 1$.

The radii of the faces 1 and 2 are respectively $r_1 = -0.78$ cm, $r_2 = +0.78$ cm.

The resulting focal length $f = 1$ cm.
The distances between the optical axis and an imaging ray from the focus F, at the point 0 and at the faces $i$ of the system, are $h = 0, h_1 = 0.1$ cm
$h_2 = 0.12388$ cm, $h_3 = 0.28644$ cm.

The heights of arc $p_i$ corresponding to the distances $h_i$ are $p_1 = -0.00644$ cm
$p_2 = +0.00990$ cm
$p_3 = -0.1132$ cm.

The optical axis $X_2$—$X_2$ and the imaging ray 4 emanating from the focus F at an angle $\sigma_1 = -14,257°$, after traversing the faces of the system enclose angles $\sigma_1' = -11.599°$
$\sigma_2' = -13,535°$
$\sigma_3' = 0°$.

The optical axis $X_2$—$X_2$ and the normals of the faces 1 and 2 at the points of intersection of the imaging ray enclose the angles $\phi_1 = -7.366°$, $\phi_2 = 9.158°$, and $\phi_3 = -37.743°$ With the aforementioned magnitudes, the coefficients of the equations (5) and (6) become, according to the equations (7) to (10), A₀ = 1.03285            C₁ = 0.89827 cm⁻¹
A₁ = 0.094200           C₂ = −0.12172 cm⁻¹
B₀ = 0.41897 cm         D₁ = 1.63280
B₁ = 0.11810 cm         D₂ = 0.90627
B₂ = 0.74334 cm         D₃* = 1.68060.

The matrices of the equations (13) are $a_{11}^{(0)} = 1.03285$        $a_{12}^{(2)} = 0.74334$ cm
$a_{11}^{(1)} = 0.94200$        $a_{21}^{(1)} = 0.84617$ cm⁻¹
$a_{12}^{(0)} = 0.41897$ cm     $a_{22}^{(1)} = 1.73889$
$a_{12}^{(1)} = 0.11810$ cm     $a_{22}^{(2)} = 0.81579$.

With these matrices, the equation (22) after transformation reads $$(\Pi_{11}^{(0)}\ \Pi_{12}^{(0)}) \begin{pmatrix} \Pi_{11}^{(1)} & \Pi_{12}^{(1)} \\ \Pi_{21}^{(1)} & \Pi_{22}^{(1)} \end{pmatrix} \begin{pmatrix} \Pi_{12}^{(2)} \\ \Pi_{22}^{(2)} \end{pmatrix} - f \cdot D_3^* = 0$$

$$(1.0385\ 0.42897) \begin{pmatrix} 0.94200 & 0.11810 \\ 0.84617 & 1.73889 \end{pmatrix} \begin{pmatrix} 0.74334 \\ 0.81579 \end{pmatrix}$$

$$= (1.32746\ 0.85052) \cdot \begin{pmatrix} 0.74334 \\ 0.81579 \end{pmatrix} = 1.68060$$

$1.68060 - f \cdot 1.68060 = 0$.

As $f$ is assumed to be one centimetre, the matrix equation is proved to be correct.

As the equations (22) and (29) generally result in aspherical meridional curves for the base of the Fresnel faces, the manufacture of such faces is rather complicated as compared to that of plane Fresnel faces. On the other hand, in some cases, particularly when the Fresnel faces have great echelon breadths, it is not necessary exactly to correct the aplanatism, because of the residual aberration inherent in such surfaces. This means that in the case of single lenses of that kind, the right side of the equation (29) need not vanish identically. If the Fresnel face used as second face is particularly favourable technologically and carried by a plane base, the spherical first face can be bent in such a manner that the departure from zero of the aplanatism function $$U(\sigma_2) = \frac{d' - p_1}{\cos^2 \delta_2} \cdot \frac{1 + \tan \varphi_1 \tan \sigma_1}{1 + \tan \varphi_1 \tan \sigma_2} \cdot \frac{s_1 - p_1}{\cos^2 \sigma_1}$$

$$\cdot \frac{n\{n - \cos(\delta_1 - \delta_2)\}}{n \cos(\delta_1 - \delta_2) - 1} + \frac{s_1 - p_1}{\cos^2 \delta_1} \cdot \frac{d' - p_1}{\cos^2 \delta_2}$$

$$\cdot \frac{r_1^2}{(r_1^2 - h^2)^{3/2}(1 + \tan \varphi_1 \tan \sigma_2)} \cdot \frac{(n \cos \delta_2 - \cos \delta_1)^2}{n \cos(\delta_1 - \delta_2) - 1}$$

$$- \frac{s_2'}{\beta_{12}' \cos^2 \sigma_2'} \cdot \frac{n\{n - \cos(\delta_2' - \delta_2)\}}{n \cos(\delta_2' - \delta_2) - 1} \quad (29a)$$

obtained as a particular case of the equation (29), becomes a minimum. In this equation, $U(\sigma_2)$ is the function defined by equation (29).

FIG. 3 illustrates a corresponding quasi-aplanatic Fresnel lens 8 which has a plane base 5 carrying a Fresnel optics 6, and a spherical face 7. The lens 8 has a thickness $d_1'$, its spherical face 7 has a radius $r_1$ and its optical axis is $X_3$—$X_3$. The data of the lens 8 are:

| | |
|---|---|
| Image scale | : $\beta' = -5.4$ |
| Index of refraction | : $n_1' = 1.5$ |
| Distance between object and vertex of the front face : | $s_1' = 9.52$ mm. |
| Distance between image and vertex of the second face : | $s_2' = 67.68$ mm. |
| Radius of spherical face 7 : | $r_1 = 50$ mm. |
| Height of arc: $p_2 = 0$ mm; | thickness: $d_1' = 5$ mm |

With these data, the magnitudes required for constructing the Fresnel lens 8 are as follows:

| h₁[mm.] | h₂[mm.] | σ₁[°] | σ'₁[°] | σ'₂[°] | U[mm.] | φ₂[°] |
|---|---|---|---|---|---|---|
| 0 | 0 | 0 | 0 | 0 | 0 | 0 |
| 5 | 6.31 | −27.18 | −15.46 | 5.33 | −1.877 | −47.60 |
| 7 | 8.55 | −34.96 | −19.00 | 7.20 | −2.593 | −55.22 |

The Fresnel lens shown in FIG. 4, which corresponds to equation (29), produces exact aplanatic images and comprises a spherically curbed face 21 and an aspherical base 22 carrying echelons 23. If this lens is calculated by means of the same values of $\beta'$, $s_1$, $s_2'$, $d_1'$, $n$, $r_1$, $p_2$, as the lens of FIG. 3, the following data are obtained:

| h₁[mm.] | h₂[mm.] | p₂[mm.] | σ₁[°] | σ'₁[°] | σ'₂[°] | U[mm.] | φ₂[°] |
|---|---|---|---|---|---|---|---|
| 0 | 0 | 0 | 0 | 0 | | 0 | 0 |
| 5 | 6.894 | 2.10 | −27.18 | −15.46 | 6.001 | 0 | −48.18 |
| 7 | 10.294 | 5.06 | −34.96 | −19.00 | 9.354 | 0 | −56.45 |

The heights of arc $p_2$ as functions of the height $h_2$ of the exit of an imaging ray from the Fresnel lens of FIG. 4, are

| h₂[mm.] | 0 | 1 | 2 | 4 | 6 | 7 | 10 |
|---|---|---|---|---|---|---|---|
| p₂[mm.] | 0 | 0.041 | 0.166 | 0.676 | 1.567 | 2.169 | 4.738 |

An aplanatic correction of any optical system cannot only be obtained by one Fresnel face having a base defined by equation (22) but by two Fresnel faces $m$ and $g$ that may be carried by any preselected base. For easy manufacture of the lens and miniaturization of its elements it will generally be preferred to use Fresnel faces on a plane base and to provide that the inclinations tan $\phi_m$ and tan $\phi_g$ — according to the terminology used hereinbefore — of the two active Fresnel flanks are such that the general condition of aplanatism (22) is arrived at.

For calculating the functions tan $\phi_m$ and tan $\phi_g$ of the active flanks, the quantities $\sigma_m'$ and $(d \tan \phi_g)/(d h_g)$ are varied until the values satisfying equation (22) are obtained. Thereupon, $\tan \phi_m$ is calculated by means of equation (2) and $\tan \phi_g$ by means of relation $$\tan \varphi_x(h) = \int_0^{hg} \frac{d \tan \varphi_x}{dh\mu} \cdot dh\mu \qquad (30)$$

The calculation is considerably simplified if the sought two Fresnel faces $m$ and $g = m+1$ follow one another with only a small distance in between, since in that case the quantity $d\,h_m$, together with $d_m' + p_{m+1} - p_m$, approaches $d\,h_{m+1}$, and this latter quantity approaches zero. By means of $\sigma_m'$ obtained through equation (22), $\tan \phi_m$ and $\tan \phi_g$ can be computed with the aid of equation (2).

A particular aplanatic Fresnel optics of considerable importance in microscopy is the aplanatic two-lens Fresnel condenser shown in FIG. 5, which comprises two exterior plane surfaces 15 and 16 and two echelon systems 17 and 18 that face each other and are respectively carried by plane bases 19 and 20. The optical axis of the condenser is designated $X_5—X_5$. The auxiliary quantities $(d \tan \phi_2)/(d\,h_2)$ and $\sigma_3'$ required for calculating the tangents of the inclinations $\tan \phi_2$ and $\tan \phi_3$ of the active flanks of 17, 19 and 18, 20 result from the following particular case of the general condition of aplanatism (22):

$$\frac{d'_2}{\cos^2 \sigma'_2} + \left\{ \frac{d'_1}{\cos^2 \sigma'_1} - \frac{n'_1 s_1 \cos \sigma'_1}{\cos^3 \sigma_1} \right\} \left\{ \frac{n'_1 \cos (\sigma'_1 - \sigma'_2) - 1}{n'_1[n'_1 - \cos (\sigma'_1 - \sigma'_2)]} \right.$$

$$\left. + \frac{d'_2}{\cos^2 \sigma'_2} \cdot \frac{(\cos \sigma'_2 - n_1 \cos \sigma'_1)^2}{n'_1 - \cos (\sigma'_1 - \sigma'_2) n'_2} \cdot \frac{d \tan \varphi_2}{dh_2} \right\}$$

$$+ \frac{1}{\beta'_{14}} \cdot \frac{1 - n'_3 \cos (\sigma'_2 - \sigma'_3)}{n'_3[\cos (\sigma'_2 - \sigma'_3) - n'_3]} \left\{ \frac{n'_3 s'_4 \cos \sigma'_3}{\cos^3 \sigma'_4} + \frac{d'_3}{\cos^2 \sigma'_3} \right\} = 0$$

The data of the condenser illustrated in FIG. 5 are as follows:

| | |
|---|---|
| Distance between lens vertex and object | $S_1 = 210$ mm. |
| Distance between lens vertex and image | $S_4' = 420$ mm. |
| Thickness of lenses | $d_1' = 3.8$ mm. $= d_3'$ |
| Thickness of air space | $d_2' = 2$ mm. |
| Refractive indices of air spaces | $n_0' = n_2' = n_4' = 1.0$ |
| Refractive indices of lenses | $n_1' = n_3' = 1.5$ |
| Image scale | $B_{14}' = -1.9881$. |

These data furnish as essential constructional elements:

| | | | | |
|---|---|---|---|---|
| $\sigma_1[°]$ | 0 | −18.44 | −29.75 | −45.00 |
| $h_1$[mm.] | 0 | 70 | 120 | 210 |
| $\sigma'_1[°]$ | 0 | −12.17 | −19.32 | −28.13 |
| $h_2$[mm.] | 0 | 70.55 | 120.89 | 212.03 |
| $\sigma'_2[°]$ | 0 | 0.54 | 1.18 | 2.53 |
| $h_3$[mm.] | 0 | 70.53 | 120.85 | 211.94 |
| $\sigma'_3[°]$ | 0 | 6.30 | 10.57 | 17.40 |
| $h_4$[mm.] | 0 | 70.11 | 120.14 | 210.75 |
| $\sigma'_4[°]$ | 0 | 9.48 | 15.96 | 26.65 |
| $\varphi_2[°]$ | 0 | −34.93 | −51.18 | −66.68 |
| $\varphi_3[°]$ | 0 | 17.54 | 28.19 | 43.09 |
| $\dfrac{d \tan \sigma_2}{d\,h_2}$ | −0.0096 | 0.0130 | −0.0112 | −0.0123 |

If the distance apart of the two condenser lenses is negligible ($d_2' \rightarrow 0$), the equation (31) is simplified as follows:

$$\frac{d'_1}{\cos^2 \sigma'_1} - \frac{n'_1 s_1 \cos \sigma'_1}{\cos^3 \sigma'_1} \cdot \frac{1 - n'_1 \cos(\sigma'_1 - \sigma'_2)}{n_1[\cos (\sigma'_1 - \sigma'_2) - n'_1]}$$

$$+ \frac{1}{\beta'_{14}} \cdot \left\{ \frac{d'_3}{\cos^2 \sigma'_3} + \frac{n'_3 s'_3 \cos \sigma'_3}{\cos^3 \sigma'_4} \right\} \cdot \frac{1 - n'_3 \cos (\sigma'_2 - \sigma'_3)}{n'_3[\cos (\sigma'_2 - \sigma'_3) - n'_3]} = 0$$

(31a)

From the equation (31a) the angles $\sigma_2'$ and $\sigma_3'$ can be deduced, and from these angles, the inclinations $\tan \phi_2$ and $\tan \phi_3$ of the active flanks can be determined by means of equation (2).

By selecting the refractive indices $n_1'$ and $n_3'$ according to the condition of achromatism, the aplanatic condenser systems can be achromatized.

With aplanatic single lenses having two Fresnel faces on plane bases, the general condition of aplanatism (22) is simplified as follows:

$$\frac{d'}{\cos^2 \sigma_2} - \frac{s_1}{\cos^2 \sigma_1} \cdot \frac{n\{n - \cos (\sigma_2 - \sigma_1)\}}{n \cos (\sigma_2 - \sigma_1) - 1}$$

$$+ \frac{s_1}{\cos^2 \sigma_1} \cdot \frac{d'}{\cos^2 \sigma_2} \cdot \frac{(n \cos \sigma_2 - \cos \sigma_1)^2}{n \cos (\sigma_2 - \sigma_1) - 1} \cdot \frac{d \tan \varphi_1}{dh_1}$$

$$+ \frac{s'_2}{\beta'_{12} \cos^2 \sigma'_2} \cdot \frac{n\{n - \cos (\sigma'_2 - \sigma_2)\}}{n \cos (\sigma'_2 - \sigma_2) - 1} = 0 \qquad (29b)$$

We claim:

1. An optical system for imaging aplanatically, particularly for imaging near-axis points without meridional coma, said system having a plurality of faces 1 to $x$ including at least one Fresnel face $m$ at any desired place; the meridional curve of the base carrying the Fresnel optics satisfying the condition $$\beta'_{1x} \cdot a_{12}^{(0,m-1)} - b_{12}^{(m,x)} = 0$$

and the normal of the active flanks of the Fresnel optics on the one hand and the optical axis of the system on the other hand enclosing an angle $\phi_m'$ which results from $$\tan \phi_m' = \frac{n'_m \sin \sigma'_m - n'_{m-1} \sin \sigma'_{m-1}}{n'_m \cos \sigma'_m - n'_{m-1} \cos \sigma'_{m-1}}$$

wherein:

$\beta'_{1x}$ is the paraxial image scale of the system;

$\Pi_{12}^{(0, m-1)}$ is a matrix defined by $\begin{pmatrix} dy_1 \\ d\sigma_1 \end{pmatrix}$ and $d\sigma_m$, and $\Sigma_{12}^{(m,x)}$ is a matrix defined by $\begin{pmatrix} d\bar{y}'_x \\ d\sigma'_x \end{pmatrix}$ $d\sigma_m, dy_1$ being the height in front of the first face of the optical system, $d\bar{y}'_x$ being the image height to the rear of the last face of the optical system, and $d\sigma_1, d\sigma_m$ and $d\sigma'_x$ being deviations at the faces 1, $m$ and $x$, respectively, from the inclinations of the imaging rays at these faces;

$n'_m$ is the refractive index on the image side of Fresnel face $m$, $n'_{m-1}$ is the refractive index on the object side of said Fresnel face, $\sigma'_m$ is the angle enclosed by the optical axis and an aperture ray on the image side of said Fresnel face; and $\sigma'_{m-1}$ is the angle enclosed by the optical axis and an aperture ray on the object side of said Fresnel face.

2. A system as claimed in claim 1, wherein the refractive powers of the parts of the system, on the object and image sides of the Fresnel face, are distributed in such a manner that departures from the aforesaid condition with respect to the meridional curve of the base carrying the Fresnel optics amount to a minimum.

3. A system as claimed in claim 2, characterized by two faces carrying Fresnel optics.

4. A system as claimed in claim 1, characterized in that it is a single lens.

5. A system as claimed in claim 4, wherein the lens face carrying the Fresnel optics in plane, and the other lens face is spherical.

6. A system as claimed in claim 1, characterized in that it is a single lens.

7. A system as claimed in claim 23 characterized by two faces carrying Fresnel optics.

8. A system as claimed in claim 7, wherein the faces carrying the Fresnel optics are plane.

9. A system as claimed in claim 8, wherein the Fresnel optics are carried by the faces of a lens.

10. A system as claimed in claim 8, characterized in that it consists of two lenses carrying Fresnel optics on the sides facing each other and are plane on their other sides.

11. A system as claimed in claim 1, wherein the refractive powers are distributed according to the condition of achromatism.

* * * * *